US011833589B2

United States Patent
Chang et al.

(10) Patent No.: US 11,833,589 B2
(45) Date of Patent: Dec. 5, 2023

(54) HINGE BRACKET OF AN INFORMATION HANDLING SYSTEM FORMED BY METAL INJECTION MOLDING

(71) Applicant: Dell Products L.P., Round Rock, TX (US)

(72) Inventors: Chih-Chieh Chang, Taipei (TW); Wei-Yi Li, Taipei (TW); Chun-Min He, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/654,452

(22) Filed: Mar. 11, 2022

(65) Prior Publication Data
US 2023/0286044 A1 Sep. 14, 2023

(51) Int. Cl.
B22F 3/22 (2006.01)
B22F 3/10 (2006.01)
G06F 1/16 (2006.01)
B22F 5/10 (2006.01)

(52) U.S. Cl.
CPC ............ B22F 3/225 (2013.01); B22F 3/1025 (2013.01); B22F 5/10 (2013.01); G06F 1/1681 (2013.01); B22F 2998/00 (2013.01)

(58) Field of Classification Search
CPC .............................. G06F 1/1681; G06F 1/1683
See application file for complete search history.

(56) References Cited

U.S. PATENT DOCUMENTS

| 2006/0002068 | A1* | 1/2006 | Kim ...................... G06F 1/1616 361/679.27 |
| 2012/0120561 | A1* | 5/2012 | Lu .......................... C22C 22/00 361/679.01 |
| 2015/0342067 | A1* | 11/2015 | Gault .................. H05K 5/0234 16/342 |
| 2017/0350479 | A1* | 12/2017 | Shimizu ................ B23P 19/084 |
| 2020/0019219 | A1* | 1/2020 | Palmer ..................... H04R 7/04 |

FOREIGN PATENT DOCUMENTS

| CN | 201615137 U | * | 10/2010 | |
| KR | 20100054693 A | * | 5/2010 | .............. G06F 1/00 |
| WO | WO-2020159534 A1 | * | 8/2020 | .......... G06F 1/1656 |
| WO | WO-2020192240 A1 | * | 10/2020 | |
| WO | WO-2022041872 A1 | * | 3/2022 | .......... B32B 15/011 |

* cited by examiner

Primary Examiner — Sally A Merkling
Assistant Examiner — Dean Mazzola
(74) Attorney, Agent, or Firm — McDermott Will & Emery LLP

(57) ABSTRACT

Method of forming a switch bracket of a hinge for a two-body information handling system, including mixing metal powders and binders to form a blended mix; pelletizing the blended mix to form feedstock; injecting the feedstock into a switch bracket mold cavity to form a first article of the switch bracket; de-binding the first article to remove the binders from the first article forming a second article of the switch bracket; and sintering the second article by shrinking the second article to form the switch bracket.

6 Claims, 11 Drawing Sheets

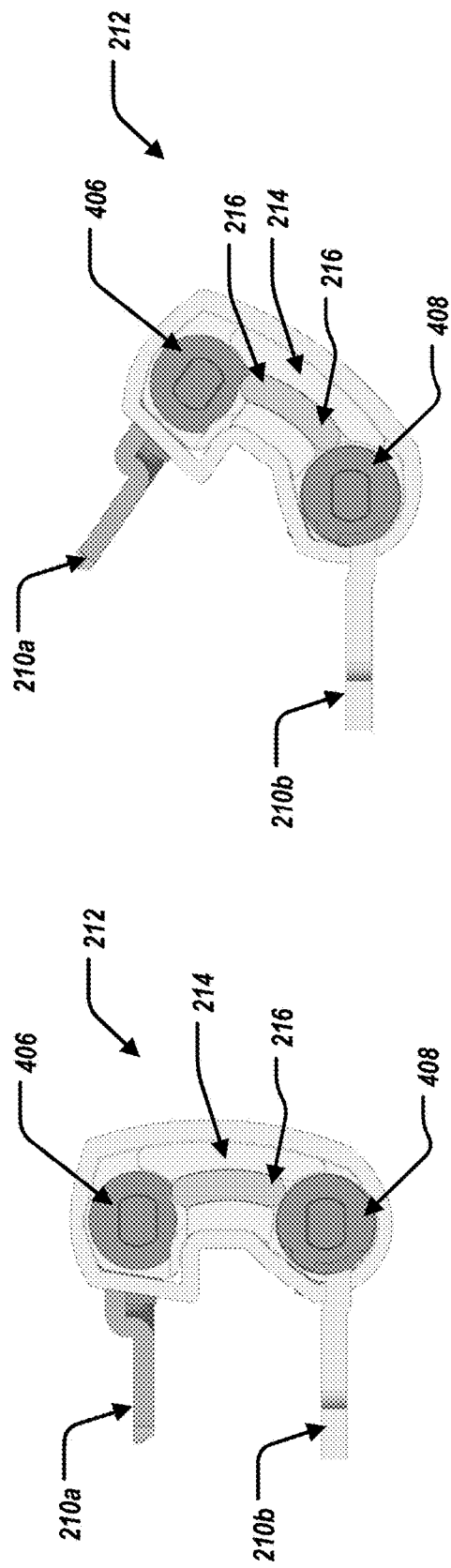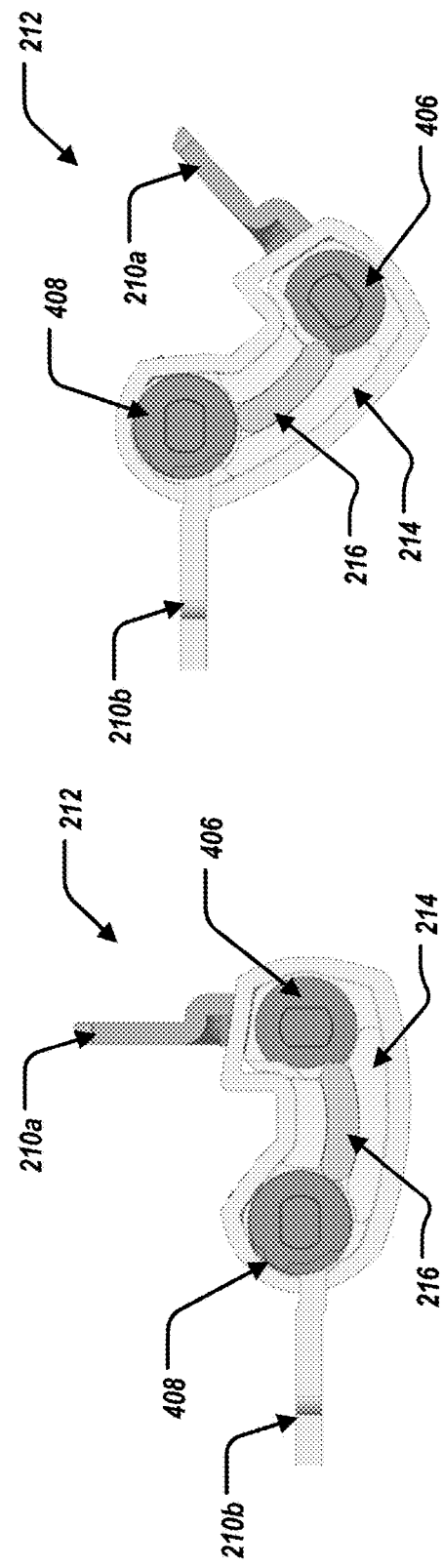

HINGE BRACKET OF AN INFORMATION HANDLING SYSTEM FORMED BY METAL INJECTION MOLDING

BACKGROUND

Field of the Disclosure

The disclosure relates generally to a hinge bracket of an information handling system that is formed by metal injection molding.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of forming a switch bracket of a hinge for a two-body information handling system, the method including mixing metal powders and binders to form a blended mix; pelletizing the blended mix to form feedstock; injecting the feedstock into a switch bracket mold cavity to form a first article of the switch bracket; de-binding the first article to remove the binders from the first article forming a second article of the switch bracket; and sintering the second article by shrinking the second article to form the switch bracket.

Other embodiments of these aspects include corresponding systems and apparatus.

These and other embodiments may each optionally include one or more of the following features. For instance, de-binding the first article includes heating the first article to melt, decompose, and/or evaporate the binders from the first article. De-binding the first article includes catalytic de-binding of the first article. After sintering the second article, surface coating and polishing the second article to form the switch bracket. Forming the switch bracket further includes forming the switch bracket to have a particular geometry such that the hinge forms a cut out in a palm rest of the information handling system of approximately 2.5 millimeters. Forming the switch bracket further includes forming the switch bracket to have a particular size such that the hinge forms a cut out in a palm rest of the information handling system of approximately 2.5 millimeters. The metal powders are SUS630 stainless steel powders.

Particular implementations of the subject matter described in this specification can be implemented so as to realize one or more of the following advantages. For example, a metal injection molding process can ensure dimensional accurately and relatively small size rigidity requirements of a switch block and a switch bracket of a hinge.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 9A-9H illustrate rotation of bodies of the information handling system via the hinge.

DESCRIPTION OF PARTICULAR EMBODIMENT(S)

Figure 1:
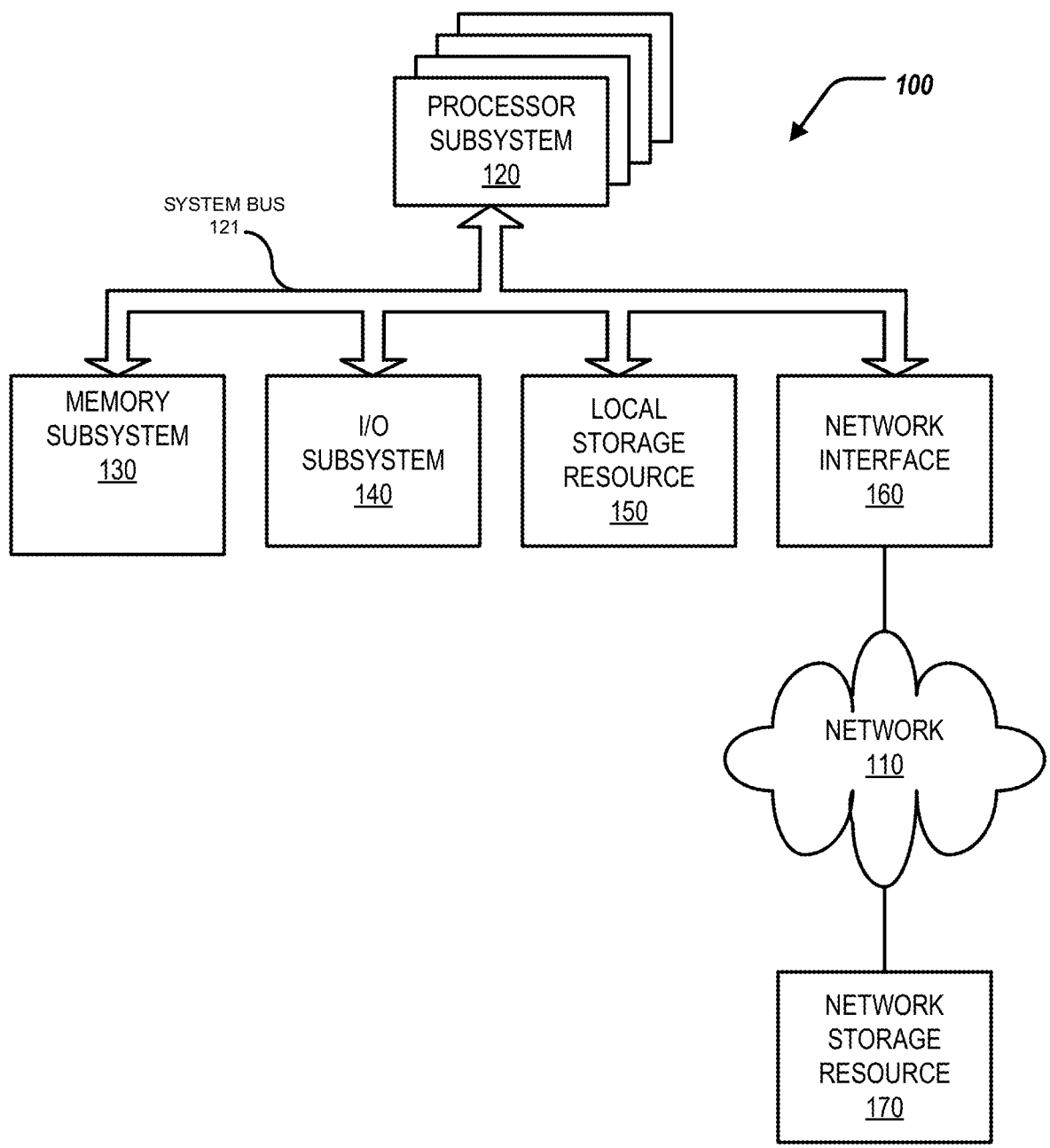
FIG. 1 is a block diagram of selected elements of an embodiment of an information handling system.

This disclosure discusses a hinge bracket of an information handling system that is formed by metal injection molding. In short, a metal injection molding process can be utilized to form a switch bracket and a switch block of a hinge of the information handling system.

Specifically, this disclosure discusses a method for forming a switch bracket of a hinge for a two-body information handling system, the method including mixing metal powders and binders to form a blended mix; pelletizing the blended mix to form feedstock; injecting the feedstock into a switch bracket mold cavity to form a first article of the switch bracket; de-binding the first article to remove the binders from the first article forming a second article of the switch bracket; and sintering the second article by shrinking the second article to form the switch bracket, wherein each body of the two-body information handling system is rotatable about the hinge that includes the switch bracket.

This disclosure further discusses a method for this disclosure discusses a method for forming a switch block of a hinge for a two-body information handling system, the method including mixing metal powders and binders to form a blended mix; pelletizing the blended mix to form feedstock; injecting the feedstock into a switch bracket mold cavity to form a first article of the switch block; de-binding the first article to remove the binders from the first article forming a second article of the switch block; and sintering the second article by shrinking the second article to form the switch block, wherein each body of the two-body information handling system is rotatable about the hinge that includes the switch block.

This disclosure further discusses a hinge for a two-body information handling system, the hinge including a switch bracket formed by a metal injection molding (MIM) process; and a switch block formed by the MIM process, the switch block slideably coupled to the switch bracket, wherein each body of the two-body information handling system is rotatable about the hinge that includes the switch block and the switch bracket.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), a compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-10 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In short, a metal injection molding process can be utilized to form a switch bracket and a switch block of a hinge of the information handling system 100.

Figure 2:
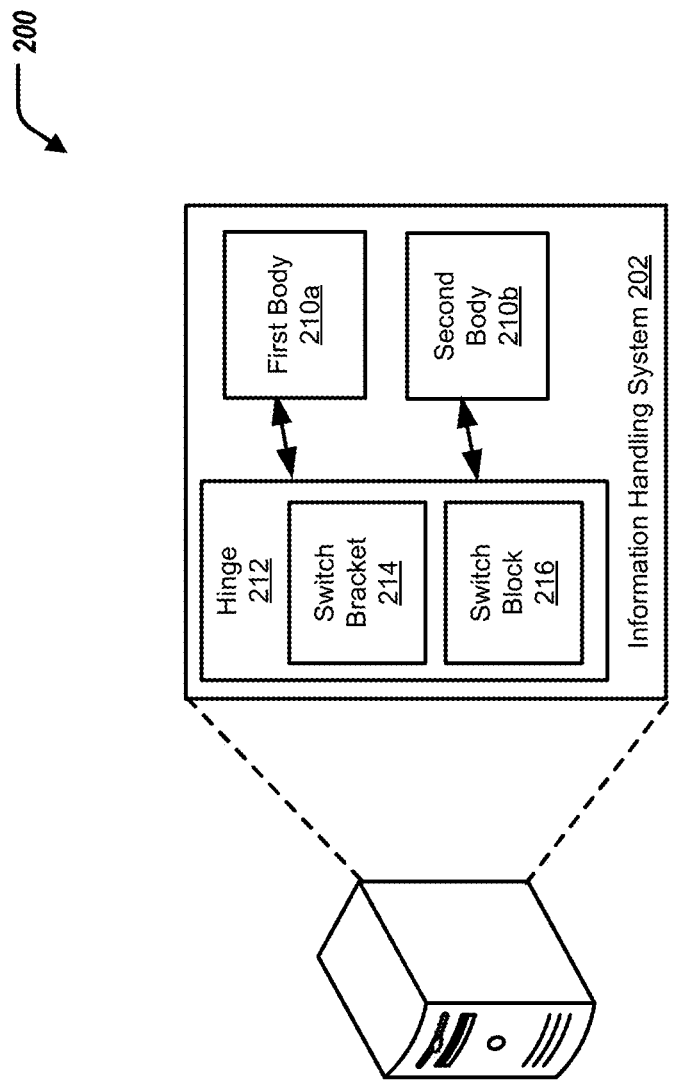
FIG. 2 illustrates a block diagram of the information handling system, including a hinge.

Turning to FIG. 2, FIG. 2 illustrates an environment 200 including an information handling system 202. The information handling system 202 can include a first body 210a and a second body 210b (collectively referred to as bodies 210). In some examples, the information handling system 202 is similar to, or includes, the information handling system 100 of FIG. 1.

The information handling system 202 can further include a hinge 212. The hinge 212 can couple the first body 210a to the second body 210b. The hinge 212 can include a switch bracket 214 and a switch block 216.

Figure 3:
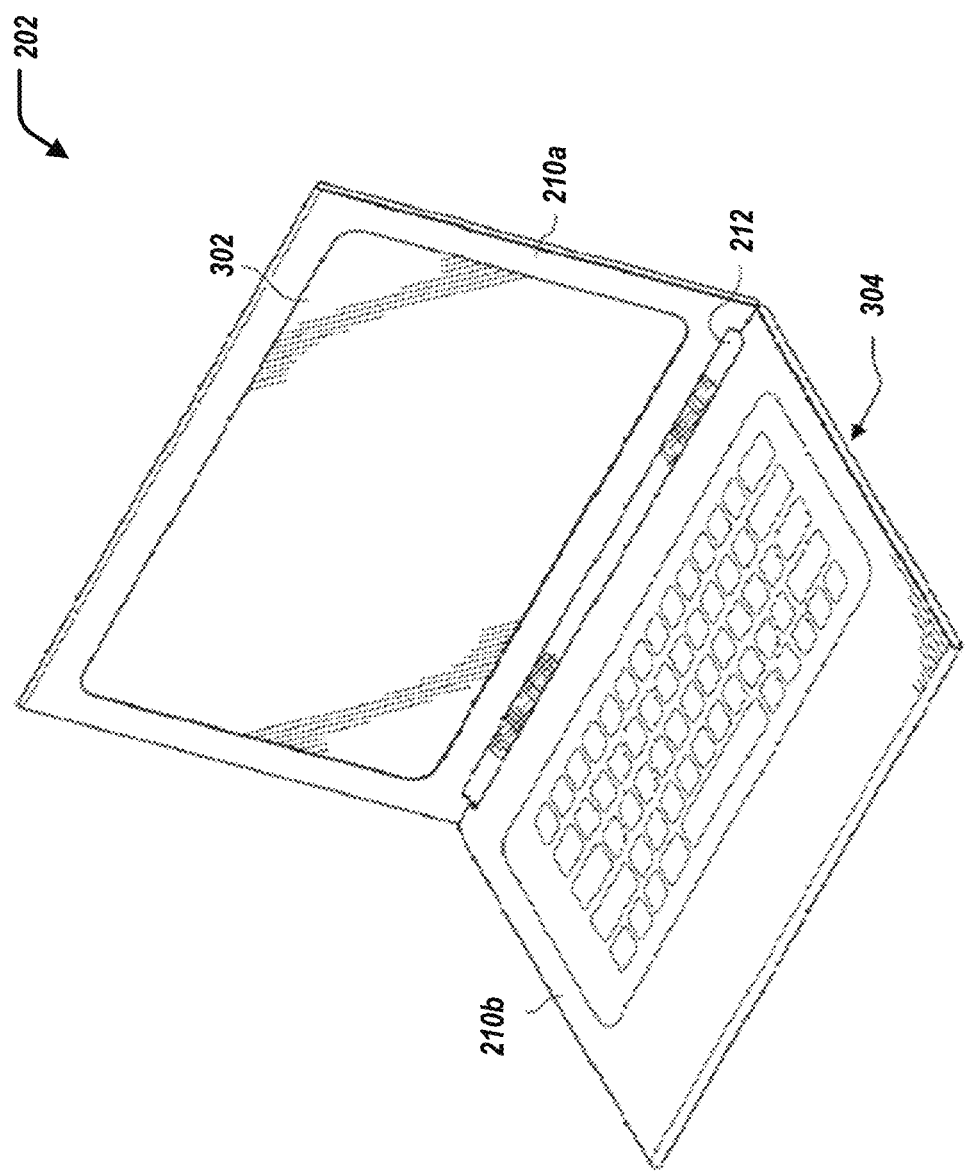
FIG. 3 illustrates a perspective view of the information handling system, including the hinge.

Turning now to FIG. 3, FIG. 3 illustrates the information handling system 202, shown as a dual-body (or two-body) information handling system 202. The information handling system 202 can include the first body 210a and the second body 210b. In some examples, the first body 210a can include a display 302 and the second body 210b can include a keyboard 304 (and typically also include computing components).

The information handling system 202 can pivot about an axis provided by the hinge 212 that connects the bodies 210, described further herein. That is, each body 210 can pivot about the axis of the hinge 212 with respect to the other body 210; and in other words, each body 210 is rotatable about the hinge 212 (that includes the switch bracket 214 and the switch block 216).

Figure 4:
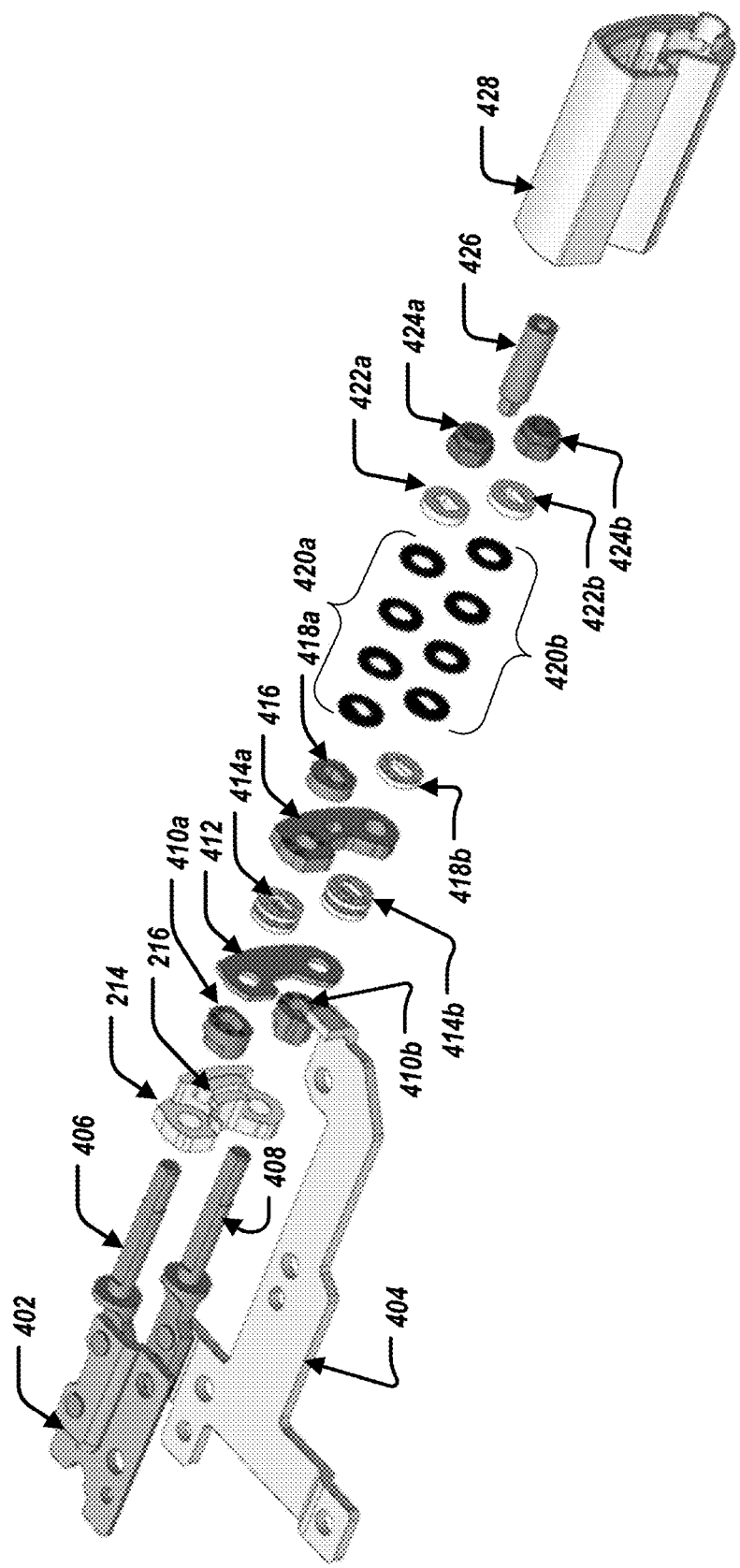
FIG. 4 illustrates an exploded view of the hinge.

FIG. 4 illustrates an exploded view of the hinge 212. The hinge 212 can include a first hinge bracket 402 that can be coupled to the first body 210a. The hinge 212 can further include an upper shaft 406 coupled to the first hinge bracket 202. The hinge 212 can include a second hinge bracket 404 that can be coupled to the second body 210b. The hinge 212 can further include a lower shaft 408 coupled to the second hinge bracket 404.

The hinge 212 can further include the switch bracket 214 and the switch block 216. The switch block 216 can be slidably coupled to the switch bracket 214. The hinge 212 can further include stoppers 410a, 410b; link bracket 412; cams 414a, 414b; fixed bracket 416; cams 418a, 418b; springs 420a, 420b; cams 422a, 422b; nuts 424a, 424b; stand-off 426; and hinge cap 428. The stopper 410a, the cam 414a, the cam 418a, the springs 420a, the cam 422a, and the nut 424a can be coupled to the upper shaft 406. The stopper 410b, the cam 414b, the cam 418b, the springs 420b, the cam 422b, and the nut 424b can be coupled to the lower shaft 408. The switch bracket 214, the link bracket 412, and the fixed bracket 416 may be coupled to both the upper shaft 406 and the lower shaft 408. The hinge cap 418 can cover substantially the upper shaft 406 and the lower shaft 408 when the stoppers 410a, 410b; the link bracket 412; the cams 414a, 414b; the fixed bracket 416; the cams 418a, 418b; the springs 420a, 420b; the cams 422a, 422b; and the nuts 424a, 424b are coupled appropriately to the upper shaft 406 and the lower shaft 408.

Figure 5:
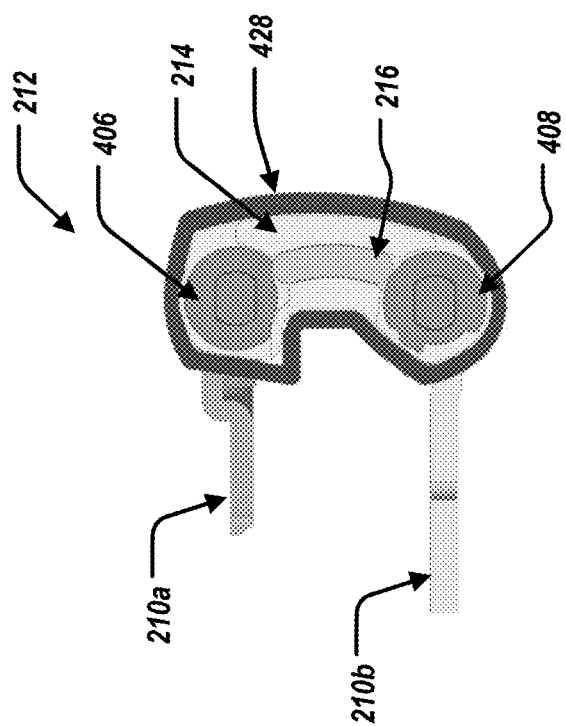
FIG. 5 illustrates a side cut-away view of the hinge.

FIG. 5 illustrates a side cut-away view of the hinge 212. The switch block 216 can interact with the upper shaft 406 and the lower shaft 408 to control a relative positioning between the bodies 210, shown further in FIGS. 9A-9H. In some examples, the switch block 216 can include a rounded geometric shape.

Figure 6:
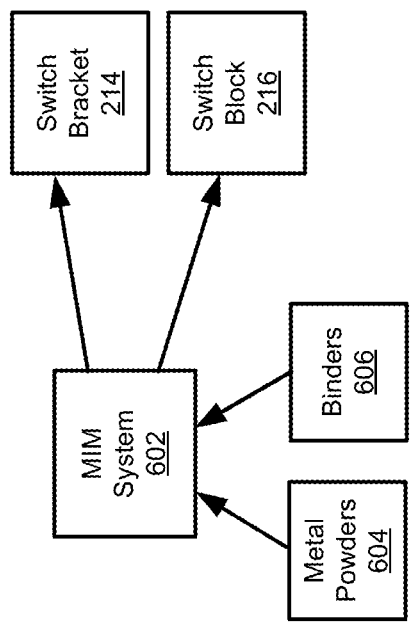
FIG. 6 illustrate a block diagram of a metal injection molding (MIM) system.

FIG. 6 illustrate a block diagram of a metal injection molding (MIM) system 602 for forming the switch bracket 214 and the switch block 216. At a high level, metal powders 604 and binders 606 can be input to the MIM system 602; and the MIM system 602 can process the metal powders 604 and the binders 606 to produce the switch bracket 214 and the switch block 216.

Figure 7:
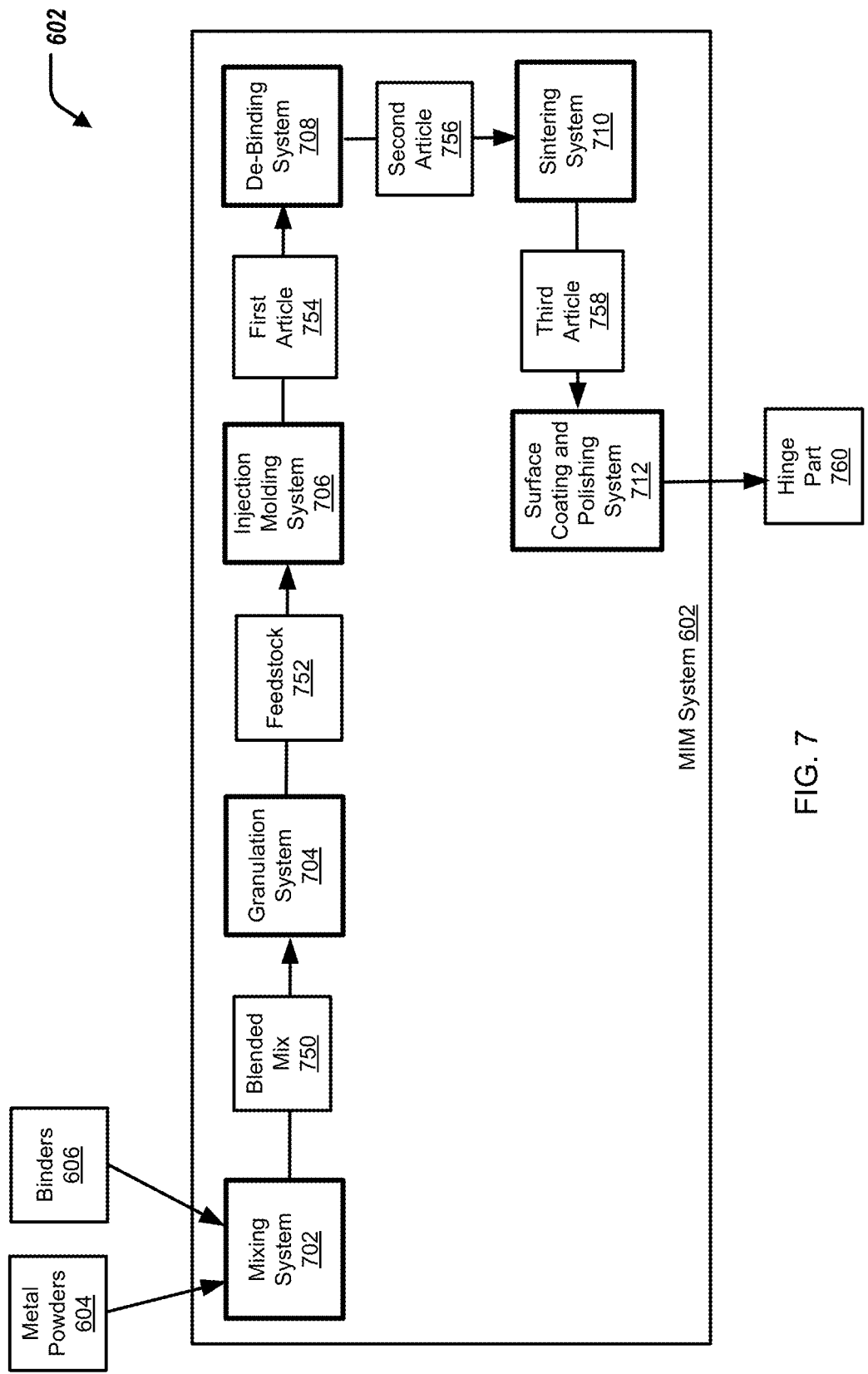
FIG. 7 illustrates a block diagram of the MIM system for forming parts of the hinge.

FIG. 7 illustrates a block diagram of the MIM system 602 for forming parts the switch bracket 214 and the switch block 216. The MIM system 602 can include a mixing system 702, a granulation system 704, an injection molding system 706, a de-binding system 708, a sintering system 710, and a surface coating and polishing system 712. The MIM system 602 can form the switch bracket 214 and the switch block 216 for the hinge 212 for the two-body information handling system 202 (shown in FIG. 2).

Metal powders 604 and binders 606 are provided to the mixing system 702. The mixing system 702 mixes the metal powders 604 with the binders 606 to form the blended mix 750. In some examples, the mixing system 702 mixes the metal powders 604 with the binders 606 at room temperature, or at an elevated (heated) temperature. The binders 606 can be heated to a temperature causing the binders 606 to melt, and the mixing system 702 mixes the metal powders 604 with the binders 606 until the metal powders 604 are uniformly coating with the binders 606. In some examples, the mixing system 702 is a twin screw extruder or a planetary mixer. In some examples, the metal powders 604 are SUS630 stainless steel powders.

The granulation system 704 pelletizes the blended mix 750 to form feedstock 752. In some examples, the blended mix 750 is cooled, and pelletized to form the feedstock 752. In some examples, the feedstock 752 can consist of pellets having diameters of approximately 2 micrometers to approximately 15 micrometers.

The injection molding system 706 receives the feedstock 752, and injects the feedstock 752 into a mold cavity to form a first article 754. In some examples, the mold cavity is a switch bracket mold cavity, and the first article 754 is of the switch bracket 214. In some examples, the mold cavity is a switch block mold cavity, and the first article 754 is of the switch block 216. The injection molding system 706 can heat the feedstock 752 (e.g., to a liquid state) and inject such into the mold cavity under high pressure. The heated feedstock 752 within the mold cavity can be cured to mold the first article 754. The first article 754 can have the same shape as the final hinge part (switch bracket 214, or switch block 216); however, the first article 754 can, in some examples, be about 20% larger (to allow for shrinkage during sintering phase, described further herein).

The de-binding system 708 receives the first article 754 and de-binds the first article 754 to remove the binders 606 from the first article 754 to form a second article 756 of the hinge part. In some examples, the second article 756 is of the switch bracket 214. In some examples, the second article 756 is of the switch block 216. In some examples, de-binding the first article 754 includes heating the first article 754 to melt, decompose, and/or evaporate the binders 606 from the first article 754. For example, the binders 606 are removed from the metal powders 604 at a temperature from approximately 400° Celsius to approximately 700° Celsius. In some examples, de-binding the first article 754 includes catalytic de-binding of the first article 754. For example, catalytic de-binding of polyacetal feedstock 752 using solvents has reduced the time for de-binding by the de-binding system 708.

The sintering system 710 receives the second article 756 and sinters the second article 756 by shrinking the second article 756 to form a third article 758. In some examples, the third article 758 is of the switch bracket 214. In some examples, the third article 758 is of the switch block 216. Sintering the second article 756 can include removing any remaining binders 606. Sintering the second article 756 can include heating the second article 756 (e.g., to a temperature of approximately 1000° Celsius to 1300° Celsius) to metallurgically bond the individual metal powders 604 together as material diffusion occurs to remove most of the porosity left by the removal of the binders 606. The sintering shrinks the second article 756 to form the third article 758, e.g., by approximately 20%. The third article 758 can be cooled, having a final geometry and strength.

The surface coating and polishing system 712 can receive the third article 758 and surface coat and polish the third article 758 to form a hinge part 760. In some examples, the hinge part 760 is of the switch bracket 214. In some examples, the hinge part 760 is of the switch block 216.

Figure 8:
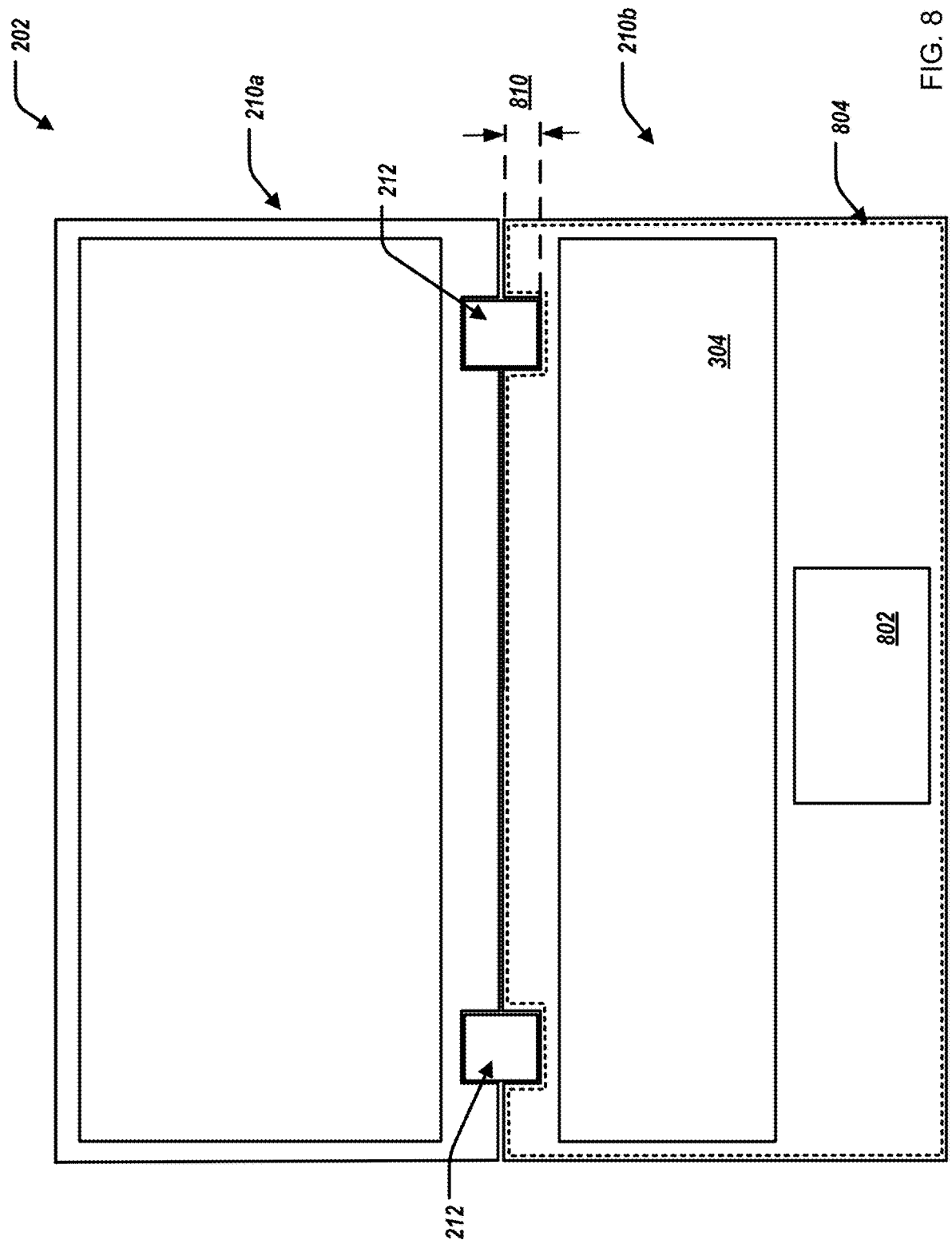
FIG. 8 illustrates a top down view of the information handling system.

FIG. 8 illustrates a top down view of the information handling system 202. Specifically, the first body 210a can be coupled to the second body 210b by the hinges 212. The second body 210b can include the keyboard 304, and a track pad 802. Furthermore, the second body 210b can include a palm rest area 804. The hinges 212 can occupy a portion of the second body 210b when the first body 210a is coupled to the second body 210b, shown by segment 810. That is, the hinges 212 can decrease the size of the palm rest area 804 where the hinges 212 are coupled to the second body 210b at the segment 810.

To that end, the hinge part 760 (the switch bracket 214, the switch block 216) can be formed to have a particular geometry and/or particular size such that the hinge 212 forms the segment 810 (cut out) in the palm rest 804 of approximately 2.5 millimeters. That is, the segment 810 can be approximately 2.5 millimeters. That is, the MIM process (of the MIM system 602) can form the switch bracket 214 and the switch block 216 to have a size and geometry such that the segment 810 can be approximately 2.5 millimeters.

Figure 9E:
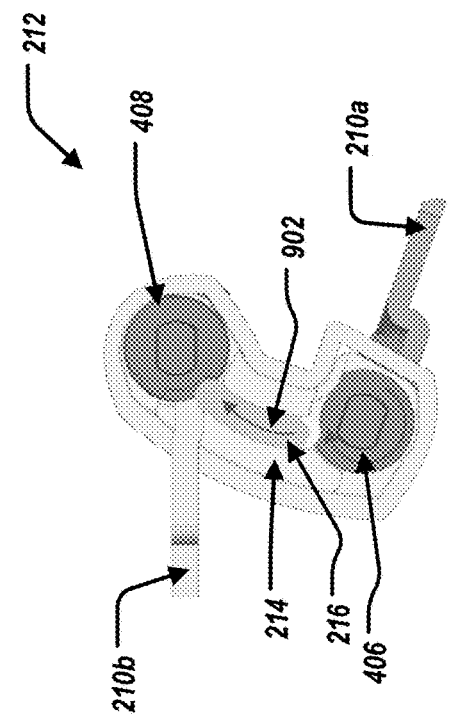
Figure 9F:
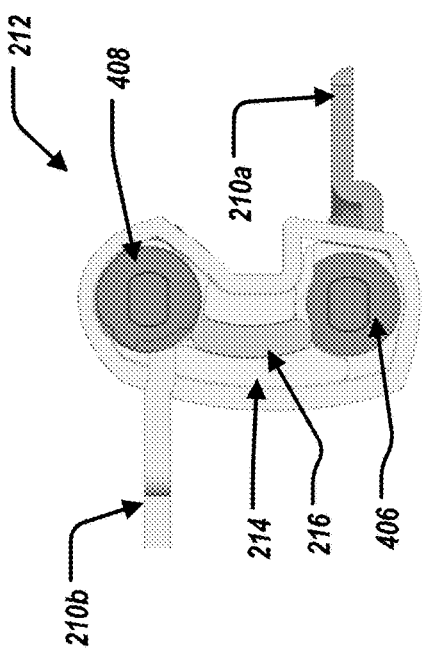

FIGS. 9A-9H illustrate rotation of the bodies 210 of the information handling system 202 via the hinge 212 (or hinges 212). FIG. 9A illustrates the bodies 210 substantially parallel to each other (e.g., in a closed position). The body 210a can be rotated about the lower shaft 408 of the hinge 212, as shown in FIGS. 9B and 9C, until the first body 210a is at an approximately 90° angle with respect to the second body 210b (e.g., a table-top position). The switch block 216 is engaged with the upper shaft 406 of the hinge 212 such that the first body 210a rotates about the lower shaft 408 of the hinge 212.

Figure 9G:
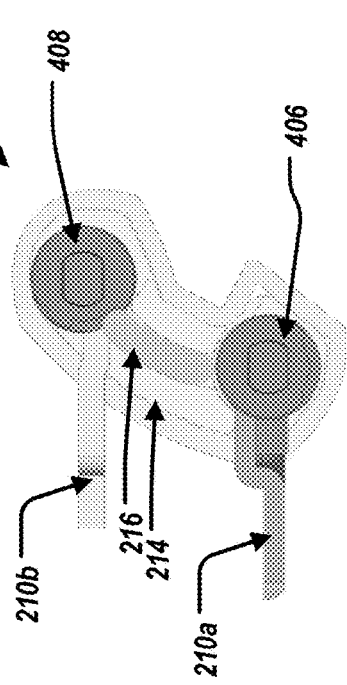
Figure 9H:
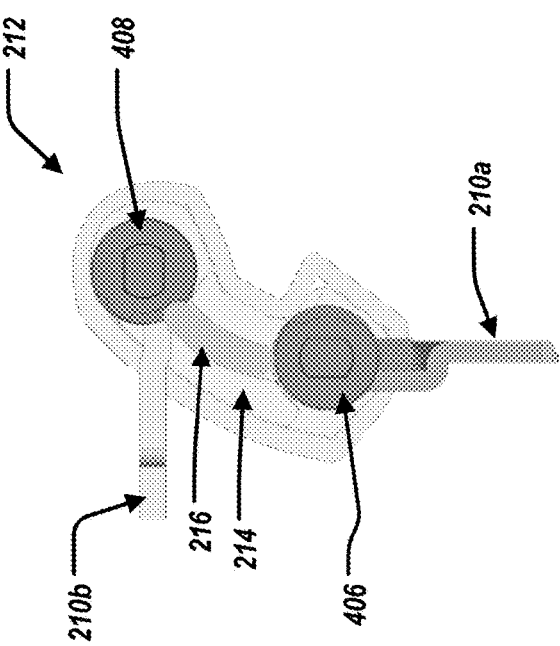

The first body 210a can continue to rotate about the lower shaft 408 of the hinge 212, as shown in FIGS. 9D and 9E, until the bodies 210 are substantially parallel to each other (e.g., in a flat position). When the first body 210a is further rotated, the switch block 216 is translated to engage the lower shaft 408 of the hinge 212, shown by direction 902 of FIG. 9F. As a result, when the first body 210a is further rotated, the first body 210a is rotated about the upper shaft 406 of the hinge 212, as shown in FIGS. 9G and 9H, until the bodies 210 are substantially parallel to each other (e.g., in a tablet position).

Figure 10:
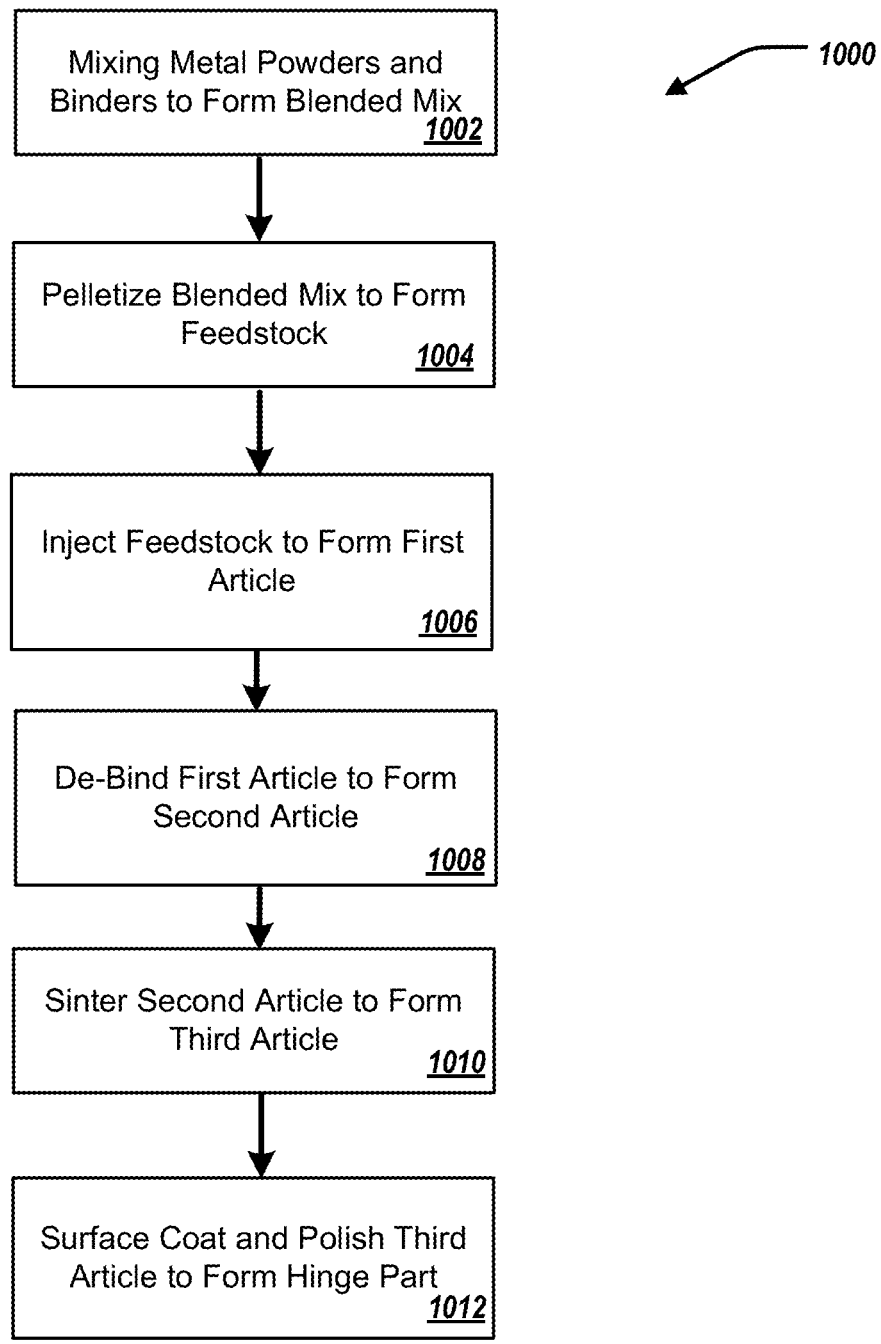
FIG. 10 illustrates a method for forming the parts of the hinge.

FIG. 10 illustrates a flowchart depicting selected elements of an embodiment of a method 1000 for forming the parts of the hinge 212. The method 1000 may be performed by the MIM system 602, and with reference to FIGS. 1-9. It is noted that certain operations described in method 1000 may be optional or may be rearranged in different embodiments.

The mixing system 702 mixes the metal powders 604 with the binders 606 to form the blended mix 750, at 1002. The granulation system 704 pelletizes the blended mix 750 to form the feedstock 752, at 1004. The injection molding system 706 injects the feedstock 752 into a mold cavity to form the first article 754, at 1006. The de-binding system 708 de-binds the first article 754 to remove the binders 606 from the first article 754 to form the second article 756, at 1008. The sintering system 710 sinters the second article 756 by shrinking the second article 756 to form the third article 758, at 1010. The surface coating and polishing system 712 surface coats and polish the third article 758 to form the hinge part 760, at 1012.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of forming a hinge for a two-body information handling system, the method comprising:
   forming a switch bracket of the hinge, including:
      mixing metal powders and binders to form a first blended mix;
      pelletizing the first blended mix to form first feedstock;
      injecting the first feedstock into a switch bracket mold cavity to form a first article of the switch bracket;
      de-binding the first article of the switch bracket to remove the binders from the first article of the switch bracket forming a second article of the switch bracket; and
      sintering the second article of the switch bracket by heating and shrinking the second article of the switch bracket to form the switch bracket;
   forming a switch block of the hinge, including:
      mixing metal powders and binders to form a second blended mix;
      pelletizing the second blended mix to form second feedstock;
      injecting the second feedstock into a switch block mold cavity to form a first article of the switch block;
      de-binding the first article of the switch block to remove the binding material from the first article of the switch block forming a second article of the switch block; and
      sintering the second article of the switch block by heating and shrinking the second article of the switch block to form the switch block;
   coupling the switch bracket i) to an upper shaft of a first hinge bracket and ii) to a lower shaft of a second hinge bracket, the upper shaft including a first flat region and the lower shaft including a second flat region;
   slidably coupling the switch block to the switch bracket such that in a first positional relationship the switch block is in contact with the first flat region of the upper shaft to engage the switch block with the upper shaft and in a second positional relationship the switch is in contact with the second flat region of the lower shaft to engage the switch block with the lower shaft.

2. The method of claim 1, wherein de-binding the first article of the switch bracket includes heating the first article of the switch bracket to melt, decompose, and/or evaporate the binders from the first article of the switch bracket.

3. The method of claim 1, wherein de-binding the first article of the switch bracket includes catalytic de-binding of the first article of the switch bracket.

4. The method of claim 1, after sintering the second article of the switch bracket, surface coating and polishing the second article to of the switch bracket form the switch bracket.

5. The method of claim 1, wherein a first body of the two body information handling system includes a cut out having a width of 2.5 millimeters, wherein the hinge is coupled to the first body at the cut out.

6. The method of claim 1, wherein the metal powders are SUS630 stainless steel powders.

* * * * *